Reissued Feb. 9, 1943

Re. 22,264

UNITED STATES PATENT OFFICE 22,264

SECONDARY AND TERTIARY 3-AMINO-METHYL-POLYHYDROXY-PHTHALIDES

Walter Siegfried Loewe, New Rochelle, N. Y., assignor to Walter Neumann, Scarsdale, N. Y.

No Drawing. Original No. 2,268,990, dated January 6, 1942, Serial No. 291,304, August 22, 1939. Application for reissue June 8, 1942, Serial No. 446,258

4 Claims. (Cl. 260—344)

My invention relates to secondary and tertiary 3-amino-methyl-polyhydroxy-phthalides and their ethers and esters and to the salts of these organic bases.

I have discovered that the primary and the mono-methyl amines of this class of chemicals are not selective in their pharmacological action. On the other hand, I have ascertained that secondary and tertiary amines of the class of chemicals above referred to upward from the ethyl amines, but excluding those containing so many carbon atoms in the side chain that the solubility of the products in the solvents of the human body, is too low for producing biological effects, are capable of influencing, with varying degrees of selectivity, the secondary phase of the antigen-antibody reaction. These novel compounds, therefore, represent valuable agents for the relief from symptoms of hypersensitiveness or for therapeutically influencing symptoms of immunity reactions in allergic diseases, infectious diseases, and the like.

My novel compounds can be expressed by the general formula:

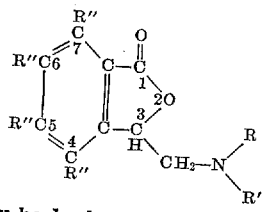

where R may be hydrogen, alkyl or aryl radical, R′ may be aryl or alkyl with more than one carbon atom, and any two or three R″ may be OH, the remaining R″ being H.

A convenient method for the preparation of any of these compounds consists in the condensation of a corresponding polyoxy benzoic acid with a corresponding secondary or tertiary amino-acetaldehyde or aminoacetal in presence of condensing agents, i. e., strong acids such as hydrochloric or acetic acid.

*Example I.*—Method of preparation of 3-(n-propylaminomethyl)-4,5,6-hydroxy-phthalide.

10 gm. of gallic acid, 9 gm. of n-propylamino-acetal, 180 cc. of glacial acetic acid, 50 cc. of concentrated hydrochloric acid and 18 cc. of water are heated together for about twelve hours at the temperature of boiling water.

The mixture is then evaporated, the residue dissolved in water, filtered, and the base precipitated from the filtrate by adding ammonia. The precipitate is washed, dissolved in dilute hydrochloric acid, filtered, the filtrate evaporated, and the salt dried in vacuo. The product may be purified by repeated precipitating of the base from an aqueous solution of the salt with ammonia, redissolving it with the aid of hydrochloric acid, filtering and evaporating the filtrate to dryness, or by treatment of the alcohol solution of the base with charcoal, or by both processes.

The hydrochloric salt is a grayish, hygroscopic powder, readily soluble in water, its aqueous solution acquiring a bluish purple color with Mitchell's reagent.

*Example II.*—Method of preparing 3-(benzyl-aminomethyl)-5,7-hydroxy-phthalide.

17 gm. of 2,4-hydroxybenzoic acid, 15 gm. of benzylaminoacetaldehyde, 300 cc. of glacial acetic acid, 80 cc. of concentrated hydrochloric acid and 30 cc. of water are heated together for about fifteen hours at 95° C. The mixture is evaporated, the residue dissolved in water, filtered, and the base precipitated from the filtrate by ammonia. The precipitate is washed, dissolved in a dilute hydrochloric acid, filtered, the filtrate, under adding water repeatedly, is slowly evaporated, the residue dissolved in water, and the base precipitated by ammonia. The purified base is a grayish powder, insoluble in water, better soluble in organic solvents. Mitchell's reagent, when added to the solution of the base in a dilute hydrochloric acid, produces a reddish-brown precipitate.

*Example III.*—Method for preparing 3-(di-n-butyl)-aminomethyl-4,5,6-hydroxy-phthalide.

11.5 gm. of gallic acid, 12 gm. of di-n-butyl-aminoacetal, 300 cc. of glacial acetic acid, 98 cc. of concentrated hydrochloric acid and 30 cc. of water are heated for about 40 hrs. on a boiling water bath. The mixture is evaporated, the residue dissolved in water, and the base precipitated with ammonia. The precipitate is then washed and dried. It represents a grayish-white powder. It is dissolved in a dilute hydrochloric acid, filtered and evaporated. The product, hydrochloric salt, represents a highly hygroscopic, light-brownish powder.

The foregoing description of the methods employed is merely illustrative of the invention. The reagents and the amounts required will vary with the particular compounds desired. Various methods may be also employed for the preparation of R- or $(R)_2$-amino substituted methyl-polyhydroxy-phthalides, as, for example, substitution of mono- or di-alkyl or -aryl-amine in place of the halogen in halogenmethyl-polyhydroxy-phthalides, without departing from the spirit of my invention as set forth in the appended claims.

I claim as my invention:

1. A substance represented by the formula:

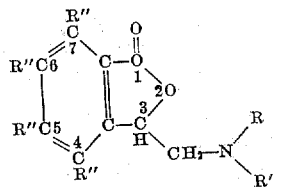

and salts thereof where R is taken from the group consisting of H, alkyl and aryl radicals containing not more than 6 carbon atoms, R′ is taken from the group consisting of aryl and alkyl radicals having at least two carbon atoms, and not more than 6 and at least two and no more than three R″ are OH, the remaining R″ being H, said substance being prepared as a therapeutic agent.

2. A compound of the group consisting in 3-(n-propyl-aminomethyl)-4,5,6-hydroxy-phthalide and salts thereof, said compound being prepared as a therapeutic agent.

3. A compound of the group consisting in 3-(benzyl-aminomethyl)-5,7-hydroxy-phthalide and salts thereof, said compound being prepared as a therapeutic agent.

4. A compound of the group consisting in 3-(di-n-butyl)-aminomethyl-4,5,6-hydroxy-phthalide and salts thereof, said compound being prepared as a therapeutic agent.

WALTER SIEGFRIED LOEWE.